United States Patent
Long et al.

(10) Patent No.: US 9,939,567 B2
(45) Date of Patent: Apr. 10, 2018

(54) COLOR FILTER SUBSTRATE AND MANUFACTURING METHOD FOR THE SAME, AND DISPLAY DEVICE

(71) Applicants: BOE TECHNOLOGY GROUP CO., LTD., Beijing (CN); BEIJING BOE OPTOELECTRONICS TECHNOLOGY CO., LTD., Beijing (CN)

(72) Inventors: Jun Long, Beijing (CN); Hongkun Zhang, Beijing (CN); Rui Li, Beijing (CN); Gang Yang, Beijing (CN)

(73) Assignees: BOE TECHNOLOGY GROUP CO., LTD., Beijing (CN); BEIJING BOE OPTOELECTRONICS TECHNOLOGY CO., LTD., Beijing (CN)

( * ) Notice: Subject to any disclaimer, the term of this patent is extended or adjusted under 35 U.S.C. 154(b) by 169 days.

(21) Appl. No.: 14/548,829

(22) Filed: Nov. 20, 2014

(65) Prior Publication Data

US 2016/0054536 A1 Feb. 25, 2016

(30) Foreign Application Priority Data

Aug. 22, 2014 (CN) .......................... 2014 1 0418302

(51) Int. Cl.
 *G02B 7/00* (2006.01)
 *G02B 5/20* (2006.01)
 *G02F 1/1339* (2006.01)
(52) U.S. Cl.
 CPC ......... *G02B 5/201* (2013.01); *G02F 1/13394* (2013.01); *G02F 2001/13396* (2013.01); *G02F 2001/13398* (2013.01)

(58) Field of Classification Search
 CPC .......................... G02B 5/201; G02F 1/133514
 (Continued)

(56) References Cited

U.S. PATENT DOCUMENTS 5,536,362 A * 7/1996 Love ..................... H01L 21/486
  216/13
6,281,960 B1   8/2001 Kishimoto et al.
 (Continued)

FOREIGN PATENT DOCUMENTS

CN      101126876 A     2/2008
CN      101276116 A    10/2008
 (Continued)

OTHER PUBLICATIONS

First Chinese Office Action dated Jun. 27, 2016; Appln. No. 201410418302.0.
 (Continued)

*Primary Examiner* — Zachary Wilkes
*Assistant Examiner* — George G King
(74) *Attorney, Agent, or Firm* — Ladas & Parry LLP

(57) ABSTRACT

Embodiments of the invention provide a color filter substrate and a manufacturing method for the same, and a display device. The color filter substrate comprises a plurality of spacers. The spacer has a cross-sectional shape in a direction parallel to the color filter substrate, and the cross-sectional shape including a first supporting portion extending along a first direction and a second supporting portion extending along a second direction, which is connected to an end portion of the first supporting portion, the first direction being perpendicular to the second direction.

17 Claims, 8 Drawing Sheets

(58) Field of Classification Search
USPC .......................................................... 359/892
See application file for complete search history.

(56) References Cited

U.S. PATENT DOCUMENTS

| | | | |
|---|---|---|---|
| 2004/0160567 A1 | 8/2004 | Kozhukh | |
| 2004/0240033 A1* | 12/2004 | Pan | G02B 26/0841 359/291 |
| 2006/0209246 A1 | 9/2006 | Kim | |
| 2010/0176720 A1* | 7/2010 | Yamazaki | H01L 27/3246 313/509 |
| 2013/0010238 A1* | 1/2013 | Chen | G02F 1/13394 349/106 |
| 2014/0118666 A1* | 5/2014 | Lee | G02F 1/13394 349/106 |
| 2015/0331161 A1* | 11/2015 | Wang | H01L 51/52 359/513 |
| 2016/0004113 A1* | 1/2016 | Guo | G02F 1/133512 359/885 |

FOREIGN PATENT DOCUMENTS

| | | | |
|---|---|---|---|
| CN | 101320169 A | 12/2008 | |
| CN | 101546071 A | 9/2009 | |
| CN | 100576027 C | 12/2009 | |
| CN | 102749754 A | 12/2009 | |
| CN | 102998853 A | 3/2013 | |
| CN | 103529591 * | 1/2014 | ....... G02F 1/133512 |
| CN | 103700688 * | 4/2014 | ............. G02B 5/201 |
| CN | 103869548 A | 6/2014 | |
| EP | 0725303 B1 | 8/1996 | |
| JP | 2002-122874 A | 4/2002 | |
| JP | 2005-250181 A | 9/2005 | |
| TW | 1316622 B | 11/2009 | |
| WO | 2013/004034 A1 | 1/2013 | |

OTHER PUBLICATIONS

Second Chinese Office Action dated Feb. 21, 2017: Appln. No. 201410418302.0.
The Third Chinese Office Action dated Oct. 16, 2017; Appln. No. 201410418302.0.

* cited by examiner

COLOR FILTER SUBSTRATE AND MANUFACTURING METHOD FOR THE SAME, AND DISPLAY DEVICE

TECHNICAL FIELD

Embodiments of the invention relate to a color filter substrate and a manufacturing method for the same, and a display device.

BACKGROUND

A Thin Film Transistor Liquid Crystal Display (TFT-LCD), as a flat-panel display device, is more frequently applied to a high-performance display field, due to characteristics such as small size, low power consumption, no radiation and relatively low production cost.

The TFT-LCD, as illustrated in FIG. 1a, consists of an array substrate 10 and a color filter substrate 11. Liquid crystal is filled between the array substrate 10 and the color filter substrate 11. In order to control stability of a thickness of a liquid crystal layer, a spacer 30 may be disposed between the array substrate 10 and the color filter substrate 11.

Specifically, as illustrated in FIG. 1a, before cell-assembling the color filter substrate 11 and the array substrate 10, a plurality of spherical spacers 30 prepared and molded in advance may be sprayed onto preset regions of a surface of the color filter substrate 11, then the cell-assembling process of the array substrate 10 and the color filter substrate 11 is performed, and finally a display device as illustrated in FIG. 1a is formed. The above-described preset regions correspond to a non-display region on the array substrate. However, the spherical spacers 30 are prone to roll. Therefore, positional deviation will occur, such that during the spraying process, some of the spherical spacers 30 are located outside the preset regions, thereby affecting an aperture ratio of the display device. In order to solve the above problem, in the prior art, cylindrical spacers are formed within the preset regions on the surface of the color filter substrate 11, so that positions of the spacers are fixed.

However, researchers find that, when a resistance test such as a pressure test, a thinning process and a polishing process is performed on the display panel constituted by the spherical or cylindrical spacers 30, or when a pressing operation or a sliding operation is performed on the display screen in use, the above spacers 30 may distort, rapture or slip because they are subjected to pressure or shearing force. In this way, debris of the damaged spacers 30, under an action of an external force, may enter the display region of the display panel, thereby causing display defect. And when the display panel is subjected to an external pressure, the panel may be dented due to insufficient restoring force of the damaged spacers 30, so that a light transmission path of a backlight will be changed, affecting grey scale of display, which further leads to uneven display of the display panel, and renders undesirable phenomena such as water ripples.

SUMMARY OF THE INVENTION

According to one embodiment of the invention, there is provided a color filter substrate, comprising a plurality of spacers, wherein, at least one of the spacers has a cross-sectional shape in a direction parallel to the color filter substrate, the cross-sectional shape including a first supporting portion extending along a first direction and a second supporting portion extending along a second direction and being connected to an end portion of the first supporting portion, the first direction being perpendicular to the second direction;

A size of the first supporting portion along the first direction is greater than a size of the first supporting portion along the second direction;

A size of the second supporting portion along the second direction is greater than a size of the second supporting portion along the first direction; the size of the second supporting portion along the first direction is less than the size of the first supporting portion along the first direction.

In one example, center lines of the first supporting portion and the second supporting portion along the first direction coincide;

The size of the first supporting portion along the second direction is equal to the size of the second supporting portion along the first direction.

In one example, a size of the spacer along a third direction is within a range of 2.8~3.5 μm;

The third direction is perpendicular to the first direction and the second direction.

In one example, a ratio of the size of the first supporting portion along the first direction to the size of the first supporting portion along the second direction is greater than or equal to 10;

A ratio of a size of the spacer along the third direction to the size of the first supporting portion along the second direction or to the size of the second supporting portion along the first direction is greater than or equal to 10.

In one example, material of the spacer includes a polyacrylic acid resin or a polyester resin.

According to another embodiment of the invention, there is provided a display device, comprising any one of the above-described color filter substrates, and an array substrate cell-assembled with the color filter substrate.

In one example, a groove is provided at a position of the array substrate corresponding to the spacer, an aperture size of the groove being greater than or equal to an outline size of a side surface of the spacer that is close to the array substrate.

According to a further embodiment of the invention, there is provided a manufacturing method for a color filter substrate, comprising preparing spacers on a base substrate of the color filter substrate, the method for preparing the spacers including:

Forming a spacer material layer on the base substrate;

Forming a photoresist layer on a surface of the spacer material layer;

Forming a plurality of photoresist-covered regions and photoresist-removed regions on a surface of the photoresist layer by a mask exposure process; wherein, the photoresist-covered regions correspond to a first supporting portion and a second supporting portion; the photoresist-removed regions correspond to other regions of the spacer material layer; the first supporting portion extends along a first direction, the second supporting portion extends along a second direction, the first direction being perpendicular to the second direction; the second supporting portion is connected to an end portion of the first supporting portion;

A size of the first supporting portion along the first direction is greater than a size thereof along the second direction;

A size of the second supporting portion along the second direction is greater than a size thereof along the first direction; the size of the second supporting portion along the first direction is less than the size of the first supporting portion along the first direction.

Removing the spacer material layer corresponding to the photoresist-removed regions;

Removing the photoresist in the photoresist-covered regions to form the spacers consisting of the first supporting portion and the second supporting portion.

In one example, center lines of the first supporting portion and the second supporting portion in parallel with the first direction coincide;

The size of the first supporting portion along the second direction is equal to the size of the second supporting portion along the first direction.

In one example, a size of the spacer material layer along a third direction is within a range of 2.8~3.5 μm;

The third direction is perpendicular to the first direction and the second direction respectively.

In one example, a ratio of the size of the first supporting portion along the first direction to the size of the first supporting portion along the second direction is greater than or equal to 10;

A ratio of a size of the spacer along the third direction to the size of the first supporting portion along the second direction or to the size of the second supporting portion along the first direction is greater than or equal to 10.

BRIEF DESCRIPTION OF THE DRAWINGS

In order to clearly illustrate the technical solution of the embodiments of the invention, the drawings of the embodiments will be briefly described in the following; it is obvious that the described drawings are only related to some embodiments of the invention and thus are not limitative of the invention.

DESCRIPTION OF THE EMBODIMENTS

In order to make objects, technical details and advantages of the embodiments of the invention apparent, the technical solutions of the embodiment will be described in a clearly and fully understandable way in connection with the drawings related to the embodiments of the invention. It is obvious that the described embodiments are just a part but not all of the embodiments of the invention. Based on the described embodiments herein, those skilled in the art can obtain other embodiment(s), without any inventive work, which should be within the scope of the invention.

Figure 1A:
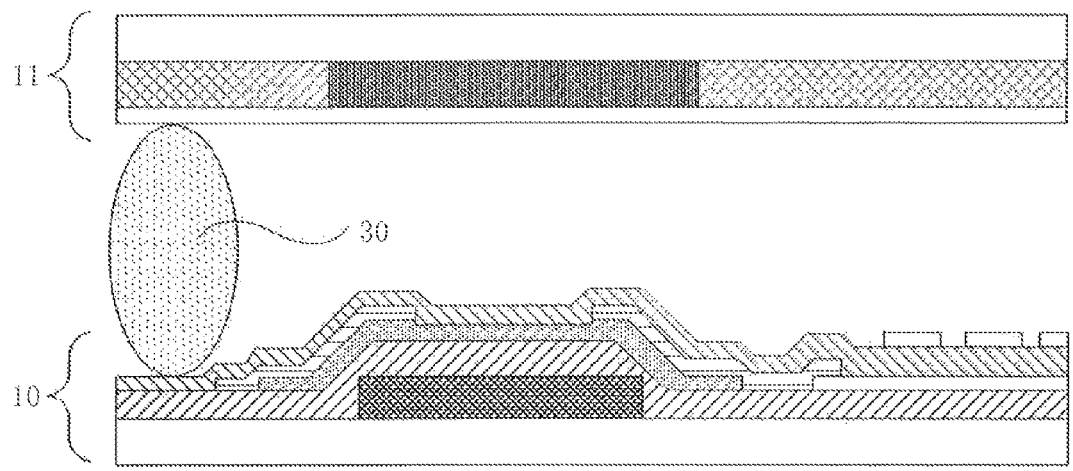
FIG. 1a is a structural schematic diagram of a display device provided in the prior art.
Figure 1B:
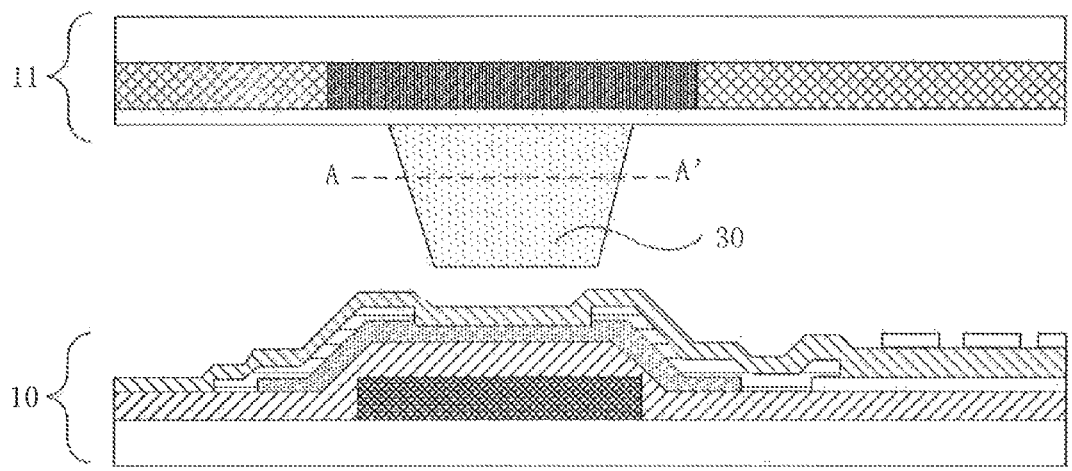
FIG. 1b is a structural schematic diagram of a display device according to an embodiment of the invention.
Figure 2A:
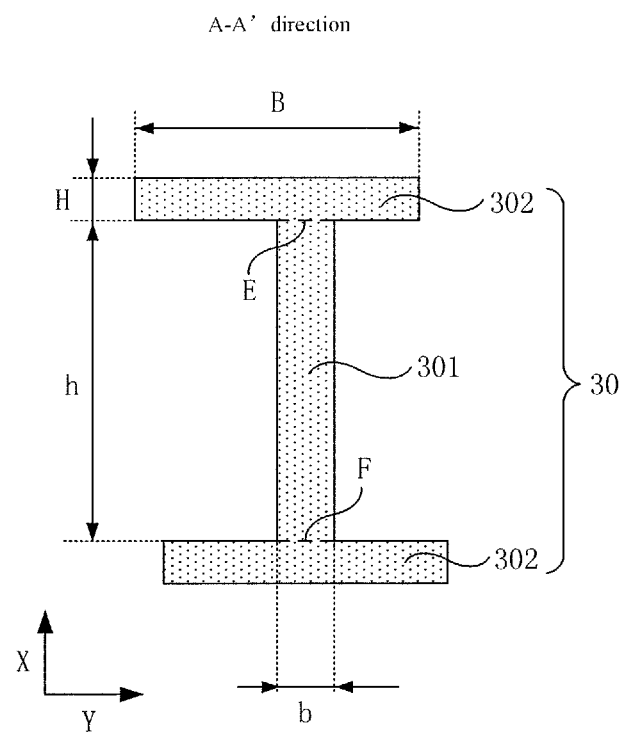
FIG. 2a-2e are cross-sectional schematic diagrams of a variety of spacers provided by the invention.

Some embodiments of the present invention provide a color filter substrate 11, as illustrated in FIG. 1b, which may comprise a plurality of spacers 30. As illustrated in FIG. 2a (a cross section is obtained by sectioning the spacer 30 in a direction A-A' parallel to the color filter substrate), the spacer 30 may include a first supporting portion 301 disposed along a first direction X and a second supporting portion 302 which is connected to the first supporting portion 301, and is located on a side surface (E and/or F) of the first supporting portion 301 parallel to a second direction Y.

A size h of the first supporting portion 301 along the first direction X is greater than a size b thereof along the second direction Y;

A size B of the second supporting portion 302 along the second direction Y is greater than a size H thereof along the first direction X. The size H of the second supporting portion 302 along the first direction X is less than the size h of the first supporting portion 301 along the first direction X.

The first direction X is perpendicular to the second direction Y.

Figure 2B:
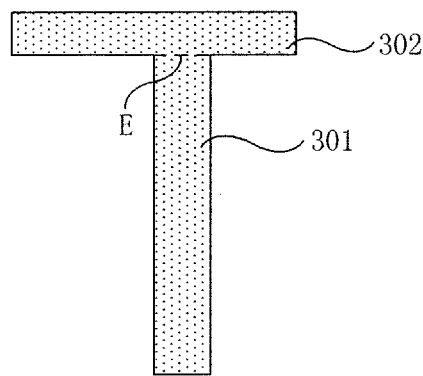

It should be noted that, as illustrated in FIG. 2a, the second supporting portion 302 may be disposed on both the E side surface and the F side surface of the first supporting portion 301. The second supporting portion 302 may also be disposed on only the E side surface (or the F side surface) of the first supporting portion 301, as illustrated in FIG. 2b.

Figure 2C:
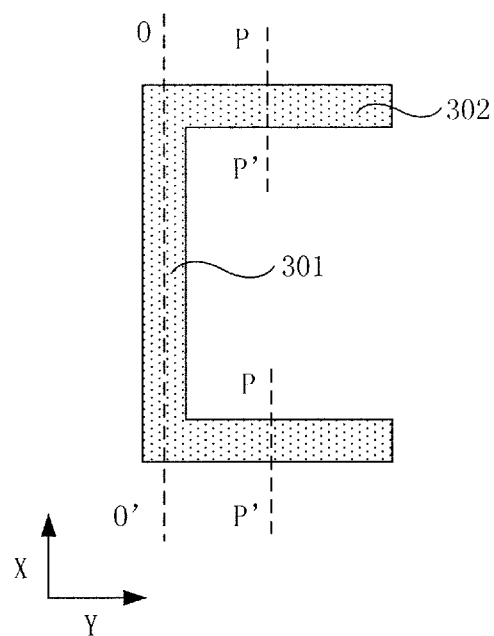
Figure 2D:
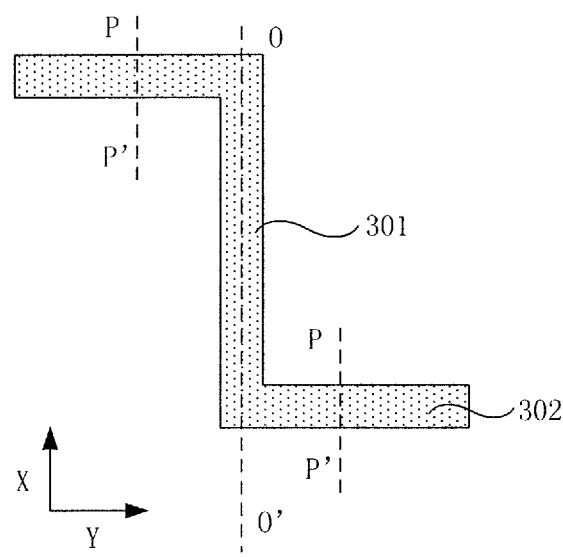

A position of a center line O-O' of the first supporting portion 301 parallel to the first direction X with respect to a center line P-P' of the second supporting portion 302 parallel to the first direction X is not limited in the invention. Therefore, the cross section of the spacer 30 may be illustrated as in FIG. 2c and FIG. 2d. It is also applicable to a case where the second supporting portion 302 is disposed on only the E side surface (or the F side surface) of the first supporting portion 301, which will not be repeated here.

Figure 2E:
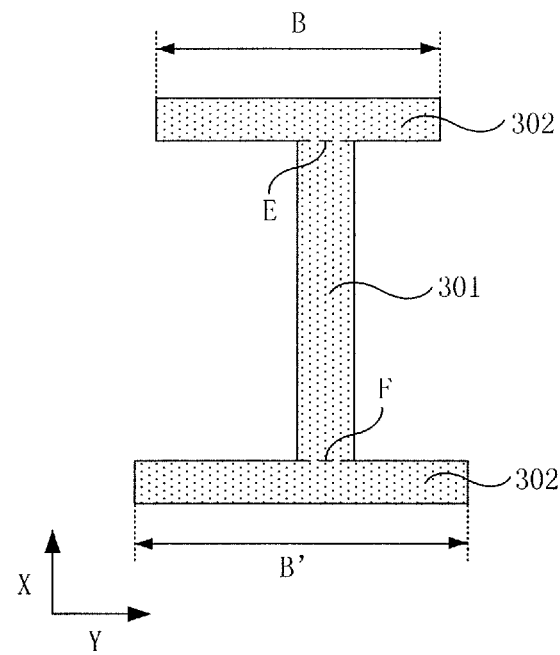

For the case where the second supporting portion 302 is disposed on both the E-side surface and the F-side surface of the first supporting portion 301, respective sizes B of the supporting portion 302 disposed on the E side surface and the supporting portion 302 disposed on the F side surface along the Y direction are not limited in the invention. For example, as illustrated in FIG. 2e, a size B of the second supporting portion 302 disposed on E side surface along the Y direction may be less than a size B' of the second supporting portion 302 disposed on F side surface along the Y direction.

Figure 3:
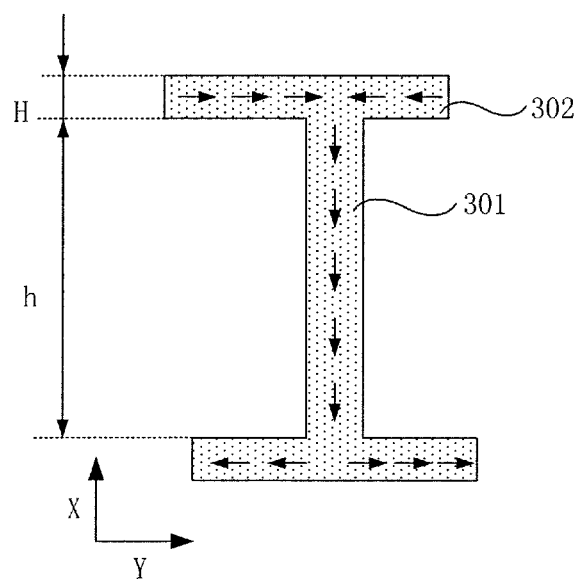
FIG. 3 is a shearing stress flow diagram of a spacer provided by an embodiment of the invention.

When the above-described spacer 30 is subjected to a twisting pressure, a distribution diagram of shearing stress is illustrated in FIG. 3, and the shearing stress, as can be seen, flows along both ends of the second supporting portion 302 toward the middle, converges at the first supporting portion 301, and upon arrival at the second supporting portion 302 on the other side of the first supporting portion 301 after passing down along the first direction X, is separated toward both ends of the second supporting portion 302. According to the above shearing stress flow, the directions of the shearing stress on the first supporting portion 301 and the second supporting portion 302 can be judged.

Further, there is not only a shearing stress on the second supporting portion 302 along the second direction Y as illustrated in FIG. 3, but also a shearing stress along the first direction X. However, because the size H of the second supporting portion 302 along the first direction X is less than the size h of the first supporting portion 301 along the first direction X, the shearing stress on the cross section of the second supporting portion 302 along the first direction X is less than the shearing stress on the cross section of the first supporting portion 301 along the first direction X; in a calculation of material mechanics, the shearing stress on the cross section of the second supporting portion 302 along the first direction X may be omitted (which is thus not illustrated in FIG. 3). In this way, the cross section of the first supporting portion 301 of the spacer bears most of the shearing force, and because the shearing stress on the cross section of the first supporting portion 301 is evenly distributed along the first direction, the maximum shearing stress $\tau_{max}$ on the cross section of the first supporting portion 301 is approximately equal to an average shearing stress $\tau$.

Figure 4A:
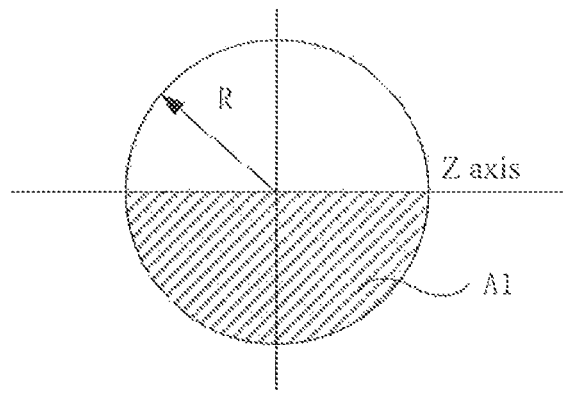
FIG. 4a is a stress diagram of a spacer with a circular cross section provided in the prior art.

In the prior art, the cross section of the spacer is typically circular or rectangular. For a circular cross section as illustrated in FIG. 4a, the maximum shearing stress on the circular cross section is $\tau_{max}$:

$$\tau_{max} = \frac{QS_z^*}{I_z b} = \frac{Q \cdot 2R^3/3}{2R \cdot \pi R^4/4} = \frac{4}{3}\frac{Q}{\pi R^2} = \frac{4}{3}\frac{Q}{A}$$

where $$I_Z = \frac{\pi R^4}{4}$$

Q—a shearing force on the cross section;
Iz—an inertia moment of the cross section with respect to a neutral axis z;
b—a width of the cross section;
Sz—a static moment of an area A1 with respect to the neutral axis z;
A—an area of the cross section.
Since $$\frac{Q}{A}$$

is the average shearing stress $\tau$ of the circular cross section, it can be seen that, the maximum shearing stress $\tau_{max}$ on the circular cross section is 4/3 times of the average shearing stress $\tau$.

Figure 4B:
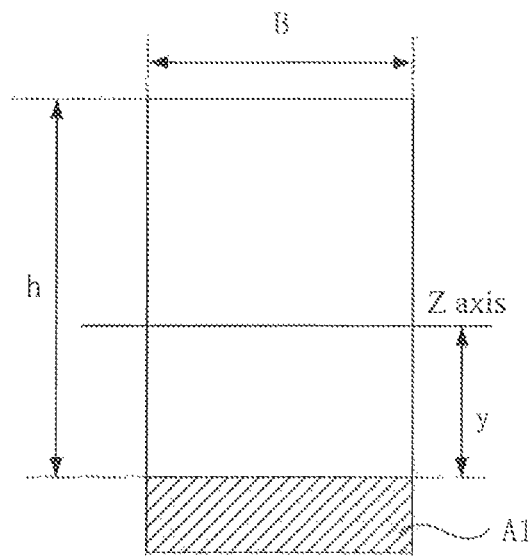
FIG. 4b is a stress diagram of a spacer with a rectangular cross section provided in the prior art.

For a rectangular cross section illustrated in FIG. 4b, the shearing stress at any point of the rectangular cross section is:

$$\tau = \frac{QS_z^*}{I_z b},$$

because $$S_z^* = b\left(\frac{h}{2} - y\right)\left[y + \frac{1}{2}\left(\frac{h}{2} - y\right)\right] = \frac{b}{2}\left(\frac{h^2}{4} - y^2\right)$$

It is derived, $$\tau = \frac{Q}{2I_z}\left(\frac{h^2}{4} - y^2\right).$$

At $$\left(y = \pm\frac{h}{2}\right)$$

of an upper edge and a lower edge of the rectangular cross section, $\tau=0$, while the shearing stress on the neutral axis (y=0) is the maximum value:

$$\tau_{max} = \frac{Qh^2}{8I_z} = \frac{3Q}{2bh} = \frac{3Q}{2A}$$

Since $$\frac{Q}{A}$$

is the average shearing stress $\tau$ of the circular cross section, it can be seen that, the maximum shearing stress $\tau_{max}$ to on the rectangular cross section is 3/2 times of the average shearing stress $\tau$.

However, the maximum shearing stress $\tau_{max}$ on the cross section of the spacer 30 provided by the invention is approximately equal to the average shearing stress $\tau$, which renders an even stress on the spacer. Therefore, probability of distortion, rupture and slippage of the spacer can be reduced when the display panel is processed, tested and used.

To sum up, some embodiments of the invention provide a color filter substrate. The color filter substrate comprises a plurality of spacers. The spacer includes a first supporting portion disposed along a first direction, and a second supporting portion connected to the first supporting portion and located on a side surface of the first supporting portion parallel to the second direction. A size of the first supporting portion along the first direction is greater than a size thereof along the second direction; a size of the second supporting portion along the second direction is greater than a size thereof along the first direction, the first direction being perpendicular to the second direction; the size of the second supporting portion along the first direction is less than the size of the first supporting portion along the first direction. In this way, when the spacer having the above-described structure is subjected to a twisting pressure, since in the first direction, a size of the second supporting portion is less than that of the first supporting portion, the shearing stress on the cross section of the second supporting portion along the first direction is less than the shearing stress on the cross section of the first supporting portion along the first direction, in a calculation of material mechanics, the shearing stress on the cross section of the second supporting portion along the first direction may be omitted. Therefore, the cross section of the first supporting portion of the spacer bears most of the shearing force, and because the shearing stress on the cross section of the first supporting portion is evenly distributed along the first direction, the maximum shearing stress on the cross section of the first supporting portion is approximately equal to an average shearing stress. Compared to the spacer with a rectangular or circular cross section in the prior art, in a case of identical stress and equal cross-sectional area, the maximum shearing stress on the rectangular cross section is 3/2 times of the average shearing stress, and the maximum shearing stress on the circular cross section is 4/3 times of the average shearing stress. Thus, the spacer provided by the invention can reduce the maximum shearing stress on the cross section, which renders an even stress on the spacer. Therefore, probability of distortion, rupture and slippage of the spacer can be reduced when the display panel is processed, tested and used, which may further improve product quality and display quality.

Figure 5A:
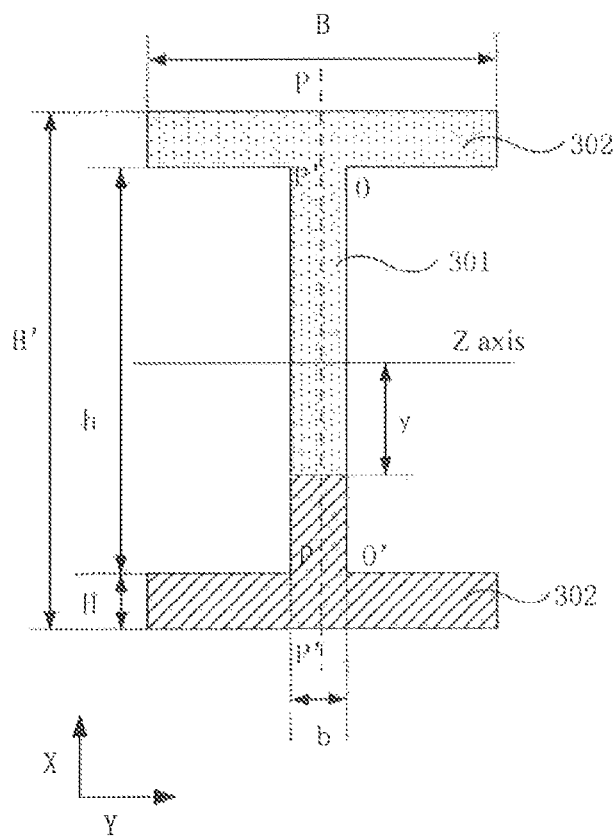
FIG. 5a is a stress diagram of a spacer with an H-shaped cross section provided by an embodiment of the invention.

In an example, for a more even stress on the spacer, for example, as illustrated in FIG. 5a, center lines (O-O' and P-P') of the first supporting portion 301 and the second supporting portion 302 parallel to the first direction X coincide.

A size b of the first supporting portion 301 along the second direction Y is equal to a size H of the second supporting portion 302 along the first direction X. In this way, the cross section of the spacer 30 is an H-shaped cross section of symmetric structure, so that the above-described shearing stress flow can, from both ends of the second supporting portion 302, evenly converge into the cross section of the first supporting portion 301, to render a more even shearing stress on the cross section of the first supporting portion 301, which further reduces a difference between the maximum shearing stress and the average shearing stress on the cross section of the first supporting portion 301.

Hereinafter, stress analysis of the shearing stress is performed for the spacer 30 with an H-shaped cross section. In material mechanics, the cross section of the second supporting portion 302 in the H-shaped cross section can be called a flange, on which the shearing stress is complicatedly distributed and is numerically small, which thus can be omitted in calculation. While the cross section of the first supporting portion 301 is called a web, on which the shearing stress is numerically large, and is distributed in line with an assumption of rectangular cross-section beams; therefore, it can be calculated by using a shearing stress calculation formula of the rectangular cross-section beams:

$$\tau = \frac{QS_z^*}{I_z b},$$

where $$S_z^* = \frac{B}{8}(H'^2 - h^2) + \frac{b}{2}\left(\frac{h^2}{4} - y^2\right);$$

hence, $$\tau_{max} = \frac{Q}{I_z b}\left(\frac{BH'^2}{8} - (B-b)\frac{h^2}{8}\right)$$

Because the web (i.e., the cross section of the first supporting portion 301) bears most of the shearing force, and because the shearing stress on the web is evenly distributed along the first direction, the maximum shearing stress $\tau_{max}$ on the web is approximately equal to $\tau$.

hence, $$\tau_{max} = \tau = \frac{Q}{bh} = \frac{Q}{A}$$

In summary, compared to the spacer with a rectangular or circular cross section in the prior art, in a case of identical stress (the shearing stress is Q) and equal cross-sectional area (A), the maximum shearing stress on the rectangular cross section is 3/2 times of the average shearing stress, and the maximum shearing stress on the circular cross section is 4/3 times of the average shearing stress. Thus, the spacer provided by the invention can reduce the maximum shearing stress on the cross section, which renders an even stress on the spacer. Therefore, probability of distortion, rupture and slippage of the spacer can be reduced when the display panel is processed, tested and used, which may further improve product quality and display quality.

Figure 5B:
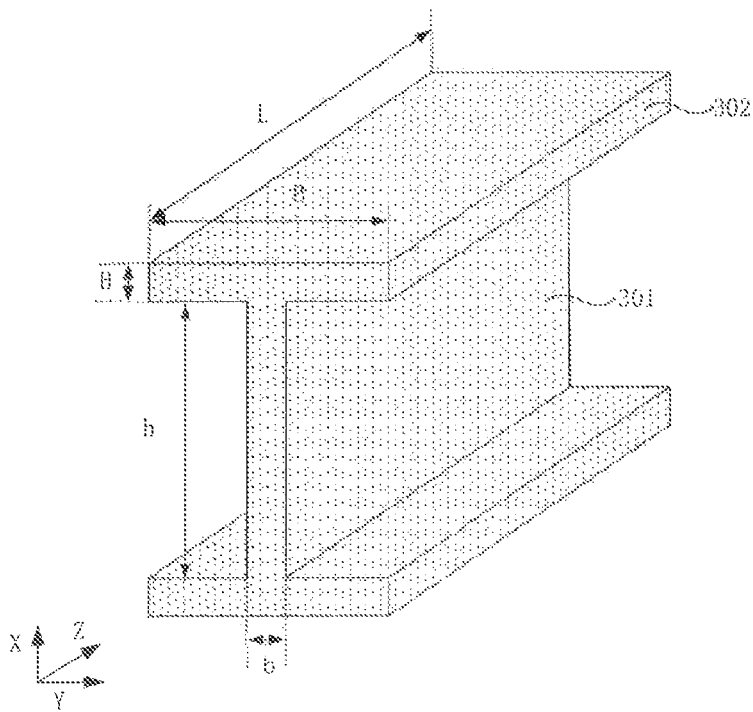
FIG. 5b is a structural schematic diagram of a spacer with an H-shaped cross section provided by an embodiment of the invention.

Since a liquid crystal layer is filled between the array substrate 10 and the color filter substrate 11, a thickness of the liquid crystal layer is called a cell thickness of the liquid crystal cell. Stability of the cell thickness can be maintained by the spacer 30. In order to reduce a thickness of the display panel as far as possible on the premise that normal operation of the display is ensured, a size L (as illustrated in FIG. 5b) of the spacer 30 along a third direction Z can be set to be 2.8~3.5 μm, wherein the third direction Z is perpendicular to the first direction X and the second direction Y respectively, that is, the third direction Z is a measuring direction of the cell thickness.

In order to further enhance support capability of the spacer 30, sizes of the first supporting portion 301 and the second supporting portion 302 constituting the spacer 30 may be set as below:

A ratio of a size h of the first supporting portion 301 along the first direction X to a size b of the first supporting portion 301 along the second direction Y is greater than or equal to 10, i.e., h/b≥10.

A ratio of a size L of the spacer 30 along the third direction Z to the size b of the first supporting portion 301 along the second direction Y or to the size H of the second supporting portion 302 along the first direction is greater than or equal to 10, i.e., L/b≥10 or L/H≥10, where b=H.

In this way, the spacer 30 satisfying the above sizes can constitute a thin-walled rod piece, i.e., a rod piece with a thinner wall on the cross section (b or H is much less than L). Due to advantages of the thin-walled rod piece such as high strength, and light weight, it can reduce weight of the spacer 30 while improving support capability thereof, so as to implement a trend to lighten and thin the display device.

Further, material of the spacer 30 may include a polyacrylic acid resin or a polyester resin.

Some embodiments of the invention provide a display device, comprising any one of the above-described color filter substrates 11 and an array substrate 10 cell-assembled with the color filter substrate, having an advantageous effect the same as the color filter substrate 11 in the forgoing embodiments. Since the detailed structure of the color filter substrate has been described in detail in the forgoing embodiments, it will not be repeated here.

In addition, a groove is provided at a position of the array substrate 10 corresponding to the spacer 30 (not illustrated in the drawings), an aperture size of the groove being greater than or equal to an outline size of a side surface of the spacer 30 that is close to the array substrate 10. For example, the cross section of the spacer 30 is an H-shaped cross section as described above, the aperture size of the groove should be greater than an outline size of the H-shaped cross section, so that the spacer 30 can be located in the groove, so as to fix the position of the spacer 30, preventing it from slipping under action of external force.

In the embodiments of the invention, the display device may specifically include a liquid crystal display device, for example, the display device may be a liquid crystal display, a liquid crystal television, a digital photo frame, a mobile phone or a tablet personal computer, and any other product or component having a display function.

Some embodiments of the invention provide a manufacturing method for a color filter substrate, which may comprise a method for fabricating spacers 30, wherein, the method for fabricating the spacers 30 includes that:

S101: forming a spacer material layer 110 on a substrate.

Figure 6A:
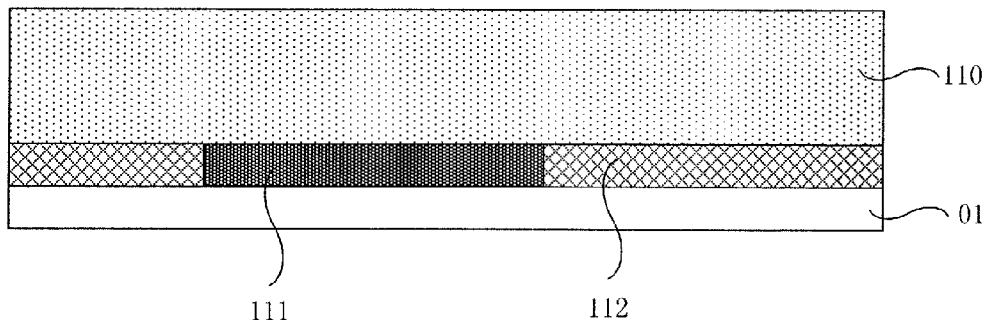
FIGS. 6a-6e are structural schematic diagrams of a spacer provided by an embodiment of the invention during a preparation process.

It should be noted that, for an In Plane Switch (IPS) display device or an Advanced-Super Dimensional Switching (ADS) display device, since a common electrode is disposed on an array substrate 10, the above-described substrate, as illustrated in FIG. 6a, may refer to a substrate with a black matrix 111 and a color filter layer 112 sequentially formed on a surface of a base substrate 01.

For a Twist Nematic (TN) display device, since the common electrode is disposed on the color filter substrate 11, the above-described substrate refers to a substrate with the black matrix 111, the color filter layer 112 and the common electrode (not illustrated in the drawings) sequentially formed on a surface of the base substrate 01.

For a Color Filter on Array (COA) display device with a black matrix and a color filter arranged on an array substrate, the above-described substrate may refer to the base substrate 01.

Figure 6B:
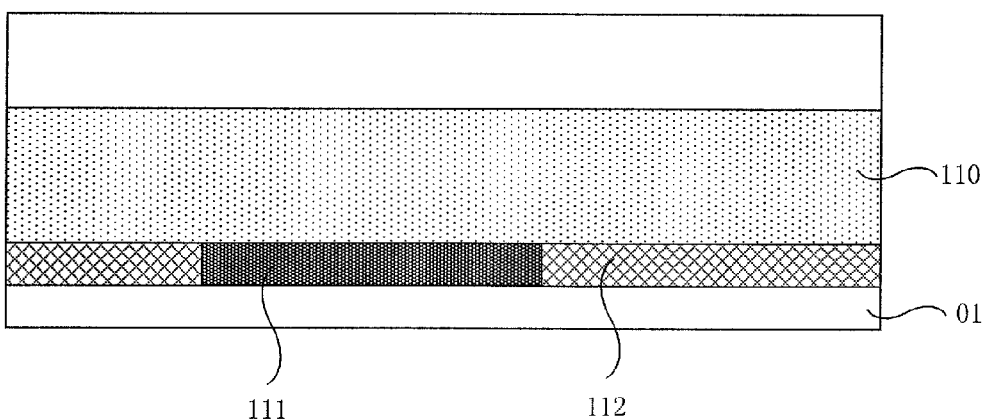

S102: as illustrated in FIG. 6b, forming a photoresist layer 120 on a surface of the spacer material layer 110.

Figure 6C:
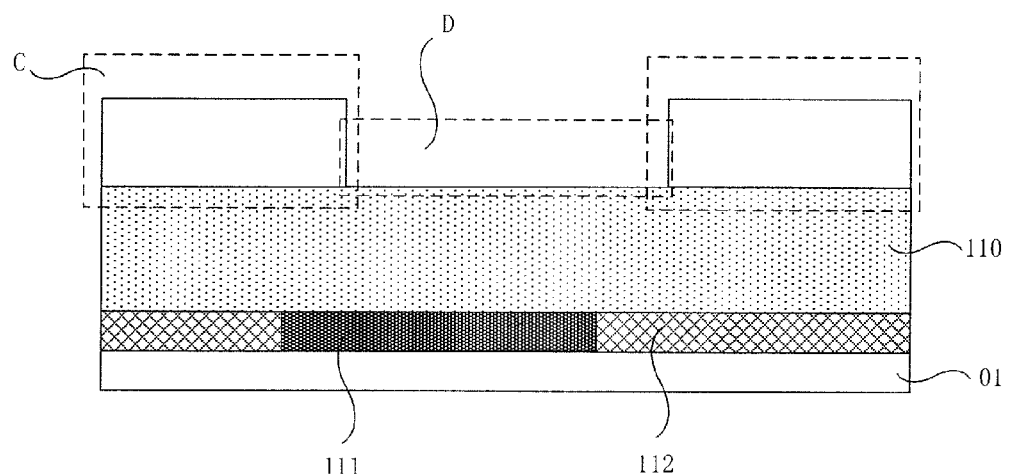

S103: as illustrated in FIG. 6c, forming a plurality of photoresist-covered regions C and photoresist-removed regions D on a surface of the photoresist layer 120 by a mask exposure process. The photoresist-covered regions C correspond to a first supporting portion 301 and a second supporting portion 302; the photoresist-removed regions D correspond to other regions of the spacer material layer 110.

The second supporting portion 302 is connected to the first supporting portion 301, and is located on a side surface (E and/or F) of the first supporting portion 301 parallel to a second direction Y.

A size h of the first supporting portion 301 along the first direction X is greater than a size b thereof along the second direction Y:

A size B of the second supporting portion 302 along the second direction Y is greater than a size H thereof along the first direction X. The size H of the second supporting portion 302 along the first direction X is less than the size h of the first supporting portion 301 along the first direction X.

The first direction X is perpendicular to the second direction Y.

Figure 6D:
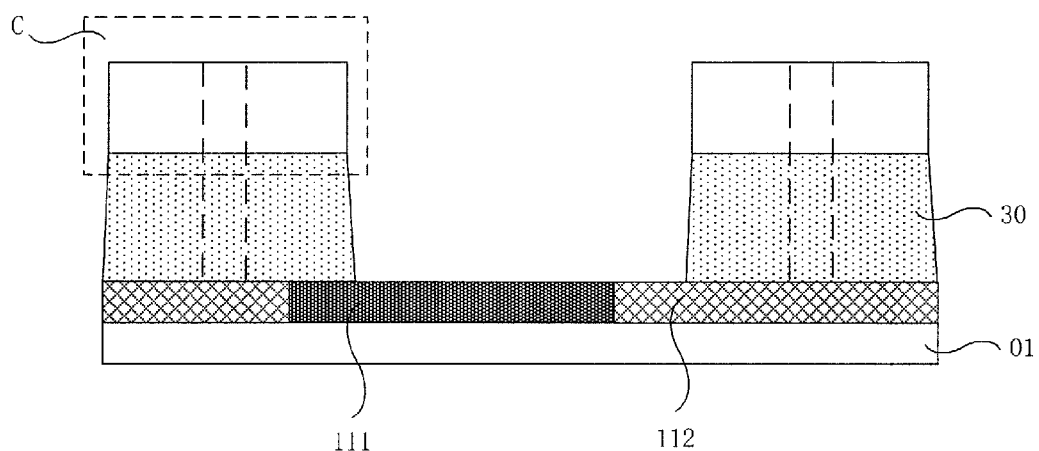

S104: as illustrated in FIG. 6d, removing the spacer material layer 110 corresponding to the photoresist-removed regions D by an etching process.

Figure 6E:
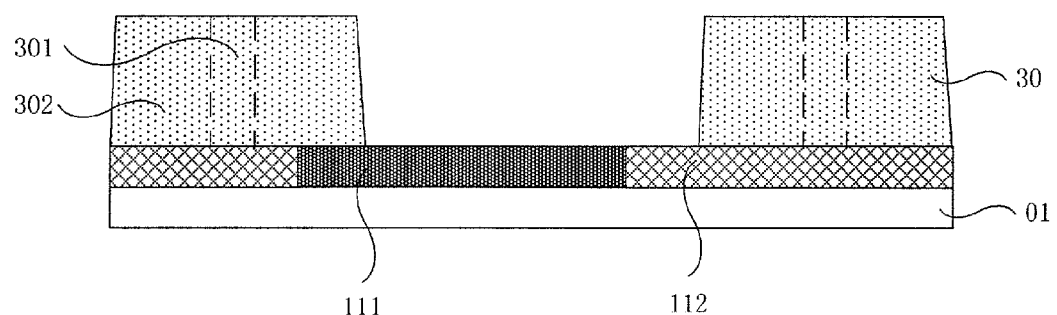

S105: as illustrated in FIG. 6e, removing the photoresist 120 in the photoresist-covered regions C to form the spacer 30 consisting of the first supporting portion 301 and the second supporting portion 302.

Some embodiments of the invention provide a manufacturing method for a color filter substrate, comprising a method for fabricating spacers. The method for fabricating the spacers includes: firstly, forming a spacer material layer on a substrate; then forming a photoresist layer on a surface of the spacer material layer; next, forming a plurality of photoresist-covered regions and photoresist-removed regions on a surface of the photoresist layer by a mask exposure process. The photoresist-covered regions correspond to a first supporting portion and a second supporting portion; the photoresist-removed regions correspond to other regions of the spacer material layer; wherein, the second supporting portion is connected to the first supporting portion, and is located on a side surface of the first supporting portion parallel to a second direction; a size of the first supporting portion along the first direction is greater than a size thereof along the second direction; a size of the second supporting portion along the second direction is greater than a size thereof along the first direction; the size of the second supporting portion along the first direction is less than the size of the first supporting portion along the first direction; the first direction is perpendicular to the second direction; next, removing the spacer material layer corresponding to the photoresist-removed regions by an etching process; finally, removing the photoresist in the photoresist-covered regions to form the spacer consisting of the first supporting portion and the second supporting portion. In this way, when the spacer having the above-described structure is subjected to a twisting pressure, since in the first direction, a size of the first supporting portion is less than that of the second supporting portion, the shearing stress on the cross section of the second supporting portion along the first direction is less than the shearing stress on the cross section of the first supporting portion along the first direction, in a calculation of material mechanics, the shearing stress on the cross section of the second supporting portion along the first direction may be omitted. Therefore, the cross section of the first supporting portion of the spacer bears most of the shearing force, and because the shearing stress on the cross section of the first supporting portion is evenly distributed along the first direction, the maximum shearing stress on the cross section of the first supporting portion is approximately equal to an average shearing stress. Compared to the spacer with a rectangular or circular cross section in the prior art, in a case of identical stress and equal cross-sectional area, the maximum shearing stress on the rectangular cross section is 3/2 times of the average shearing stress, and the maximum shearing stress on the circular cross section is 4/3 times of the average shearing stress. Thus, the spacer provided by the invention can reduce the maximum shearing stress on the cross section, which renders an even stress on the spacer. Therefore, probability of distortion, rupture and slippage of the spacer can be reduced when the display panel is processed, tested and used, which may further improve product quality and display quality.

In an example, for a more even stress on the spacer, for example, as illustrated in FIG. 5a, center lines (O-O' and P-P') of the first supporting portion 301 and the second supporting portion 302 parallel to the first direction X may coincide.

A size b of the first supporting portion 301 along the second direction Y is equal to a size H of the second supporting portion 302 along the first direction X. In this way, the cross section of the spacer 30 is an H-shaped cross section of symmetric structure, so that the above-described shearing stress flow can, from both ends of the second supporting portion 302, evenly converge into the cross section of the first supporting portion 301, to render a more even shearing stress on the cross section of the first supporting portion 301, which further reduces a difference between the maximum shearing stress and the average shearing stress on the cross section of the first supporting portion 301.

Since a liquid crystal layer is filled between the array substrate 10 and the color filter substrate 11, a thickness of the liquid crystal layer is called a cell thickness of the liquid crystal cell. Stability of the cell thickness can be maintained by the spacer 30. In order to reduce a thickness of the display panel as far as possible on the premise that normal operation of the display is ensured, a size L (as illustrated in FIG. 5b) of the spacer 30 along a third direction Z can be set to be 2.8~3.5 μm, wherein the third direction Z is perpendicular to the first direction X and the second direction Y respectively, that is, the third direction Z is a measuring direction of the box thickness.

In order to further enhance support capability of the spacer 30, sizes of the first supporting portion 301 and the second supporting portion 302 constituting the spacer 30 may be set as below:

A ratio of a size h of the first supporting portion 301 along the first direction X to a size b of the first supporting portion 301 along the second direction Y is greater than or equal to 10, i.e., h/b≥10.

A ratio of a size L of the spacer 30 along the third direction Z to the size b of the first supporting portion 301 along the second direction Y or to the size H of the second supporting portion 302 along the first direction is greater than or equal to 10, i.e., L/b≥10 or L/H≥10, where b=H.

In this way, the spacer 30 satisfying the above sizes can constitute a thin-walled rod piece, i.e., a rod piece with a thinner wall on the cross section. Due to advantages of the thin-walled rod piece such as high strength, and light weight, it can reduce weight of the spacers 30 while improving support capability thereof, so as to implement a trend to lighten and thin the display device.

The foregoing embodiments merely are exemplary embodiments of the invention, and not intended to define the scope of the invention, and the scope of the invention is determined by the appended claims.

The present application claims priority of Chinese Patent Application No. 201410418302.0 filed on Aug. 22, 2014, and the full-text published content of the above Chinese patent application is incorporated by reference herein as part of the present application.

What is claimed is:

1. A color filter substrate, comprising a plurality of spacers, wherein, at least one of the spacers has a cross-sectional shape in a direction parallel to the color filter substrate, the cross-sectional shape including a first supporting portion extending along a first direction and two second supporting portions extending along a second direction and being connected to two end portions of the first supporting portion, the first direction being perpendicular to the second direction;
   a size of the first supporting portion along the first direction is greater than a size of the first supporting portion along the second direction;
   a size of the second supporting portions along the second direction is greater than a size of the second supporting portions along the first direction; the size of the second supporting portions along the first direction is less than the size of the first supporting portion along the first direction,
   wherein each of the spacers consist of one first supporting portion and two second supporting portions, center lines of the first supporting portion and the second supporting portions along the first direction do not coincide, the two second supporting portions are connected to the two end portions of the first supporting portion respectively and the two second supporting portions are provided on two opposite sides of the first supporting portion respectively.

2. The color filter substrate according to claim 1, wherein, the size of the first supporting portion along the second direction is equal to the size of the second supporting portions along the first direction.

3. The color filter substrate according to claim 1, wherein, a size of the spacers along the a third direction is within a range of 2.8~3.5 μm;
   the third direction is perpendicular to the first direction and the second direction.

4. The color filter substrate according to claim 1, wherein, material of the spacers includes a polyacrylic acid resin or a polyester resin.

5. A display device comprising an array substrate of claim 1 and a color filter substrate cell-assembled with each other.

6. The display device according to claim 5, wherein;
   grooves are provided at a position of the array substrate corresponding to the spacers, an aperture size of the grooves being greater than or equal to an outline size of a side surface of the spacers that is close to the array substrate.

7. The display device according to claim 5, wherein,
   the size of the first supporting portion along the second direction is equal to the size of the second supporting portions along the first direction.

8. The display device according to claim 5, wherein, a size of the spacers along a third direction is within a range of 2.8~3.5 μm;
   the third direction is perpendicular to the first direction and the second direction.

9. The display device according to claim 5, wherein, material of the spacers includes a polyacrylic acid resin or a polyester resin.

10. A manufacturing method for a color filter substrate, comprising preparing spacers on a base substrate of the color filter substrate, the method for preparing the spacers including:
    forming a spacer material layer on the base substrate;
    forming a photoresist layer on a surface of the spacer material layer;
    forming a plurality of photoresist-covered regions and photoresist-removed regions on a surface of the photoresist layer by a mask exposure process; wherein, the photoresist-covered regions correspond to a first supporting portion and two second supporting portions; the photoresist-removed regions correspond to other regions of the spacer material layer; the first supporting portion extends along a first direction, the second supporting portions extend along a second direction, the first direction being perpendicular to the second direction; the second supporting portions are connected to two end portions of the first supporting portion;
    a size of the first supporting portion along the first direction is greater than a size thereof along the second direction;
    a size of the second supporting portions along the second direction is greater than a size thereof along the first direction; the size of the second supporting portions along the first direction is less than the size of the first supporting portion along the first direction;
    removing the spacer material layer corresponding to the photoresist-removed regions;
    removing the photoresist in the photoresist-covered regions to form the spacers consisting of the first supporting portion and the second supporting portions;
    wherein each of the spacers consist of one first supporting portion and two second supporting portions, center lines of the first supporting portion and the second supporting portions in parallel with the first direction does not coincide, the two second supporting portions are connected to the two end portions of the first supporting portion respectively and the two second supporting portions are provided on two opposite sides of the first supporting portion respectively.

11. The manufacturing method for the color filter substrate according to claim 10, wherein, the size of the first supporting portion along the second direction is equal to the size of the second supporting portions along the first direction.

12. The manufacturing method for the color filter substrate according to claim 10, wherein, a size of the spacer material layer along a third direction is within a range of 2.8~3.5 μm;

the third direction is perpendicular to the first direction and the second direction respectively.

13. The color filter substrate according to claim 3, wherein a ratio of the size of the first supporting portion along the first direction to the size of the first supporting portion along the second direction is greater than or equal to 10;

a ratio of a size of the spacers along the third direction to the size of the first supporting portion along the second direction or to the size of the second supporting portions along the first direction is greater than or equal to 10.

14. The display device according to claim 8, wherein a ratio of the size of the first supporting portion along the first direction to the size of the first supporting portion along the second direction is greater than or equal to 10;

a ratio of a size of the spacers along the third direction to the size of the first supporting portion along the second direction or to the size of the second supporting portions along the first direction is greater than or equal to 10.

15. The manufacturing method for the color filter substrate according to claim 12, wherein a ratio of the size of the first supporting portion along the first direction to the size of the first supporting portion along the second direction is greater than or equal to 10;

a ratio of a size of the spacers along a third direction to the size of the first supporting portion along the second direction or to the size of the second supporting portions along the first direction is greater than or equal to 10.

16. The color filter substrate according to claim 1, wherein the spacers directly contact the color filter substrate.

17. The display device according to claim 6, wherein the spacers are located in grooves of an array substrate which is cell-assembled with the color filter substrate.

* * * * *